(12) United States Patent
Lange

(10) Patent No.: US 7,390,061 B2
(45) Date of Patent: Jun. 24, 2008

(54) DEVICE FOR ADJUSTMENT OF LEVEL OF INCLINATION OF BACK PART OF MOTOR VEHICLE SEAT

(75) Inventor: Dieter Lange, Petershagen (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 11/073,989

(22) Filed: Mar. 7, 2005

(65) Prior Publication Data

US 2005/0211005 A1    Sep. 29, 2005

(30) Foreign Application Priority Data

Mar. 9, 2004  (DE) .................. 10 2004 011 268

(51) Int. Cl.
*B60N 2/02* (2006.01)
*A47B 97/00* (2006.01)

(52) U.S. Cl. ..................... 297/362; 297/463.1
(58) Field of Classification Search ............... 297/362, 297/367, 463.1; 475/178, 175
See application file for complete search history.

(56) References Cited

U.S. PATENT DOCUMENTS

| | | | |
|---|---|---|---|
| 5,308,294 A | 5/1994 | Wittig et al. | |
| 5,524,970 A * | 6/1996 | Kienke et al. | 297/362 |
| 5,692,589 A * | 12/1997 | Beguin | 192/39 |
| 5,871,414 A * | 2/1999 | Voss et al. | 475/175 |
| 6,305,748 B1 * | 10/2001 | Ohba | 297/362 |
| 6,619,743 B1 * | 9/2003 | Scholz et al. | 297/362 |
| 6,637,821 B2 * | 10/2003 | Lee et al. | 297/362 |
| 6,692,397 B2 * | 2/2004 | Wang et al. | 475/162 |
| 6,805,650 B2 * | 10/2004 | Branov et al. | 475/162 |
| 6,918,635 B2 * | 7/2005 | Finner et al. | 297/362 |
| 2002/0050732 A1 * | 5/2002 | Koga et al. | 297/362 |
| 2005/0110322 A1 * | 5/2005 | Cha | 297/362 |

FOREIGN PATENT DOCUMENTS

DE         3729134 A1 *  3/1989
DE      101 34 355 A1    1/2003

* cited by examiner

*Primary Examiner*—Sarah B McPartlin
(74) *Attorney, Agent, or Firm*—Synnestvedt & Lechner LLP

(57) ABSTRACT

A device for adjustment of the level of inclination of the back part of a motor vehicle seat having a device part (2) connected to the seat part and a device part (3) connected to the backrest, which can be pivoted opposite to each other about a pivot axis (14), wherein both device parts (2,3) have parts of gearings (4,5) forming a swash mechanism, which roll over each other under the influence of cam means (11) that can be rotated about a pivot axis (14). The drive of the cam means (11) is provided via a two-part carrier, comprised of a metal carrier boss (17) and a metal carrier plate (18) non-rotatingly connected therewith. The carrier boss (17) has a collar (17.2) for axial bracketing of the device parts (2,3) on one side of the device for adjustment of the level of inclination (1). The object is to configure this type of device for adjustment of the level of inclination, so that no longer requires an additional locking ring for axial bilateral bracketing of the device parts (2,3). The solution resides in the fact that the carrier plate (18) is fastened axially to the carrier boss (17) on the other side of the device for adjustment of the level of inclination (1) for completion of the bracketing of the device parts (2,3).

5 Claims, 6 Drawing Sheets

DEVICE FOR ADJUSTMENT OF LEVEL OF INCLINATION OF BACK PART OF MOTOR VEHICLE SEAT

CROSS REFERENCE TO RELATED APPLICATIONS

This application claims the priority of German Patent Application 10 2004 011 268.1 filed on Mar. 9, 2004, the entire contents of which is hereby incorporated in total by reference.

BACKGROUND OF THE INVENTION

1. Field of the Invention

The present invention relates to a device for adjustment of the level of inclination of the back part of a motor vehicle seat.

2. Description of Related Art

This type of device for adjustment of the level of inclination is well-known from DE 43 03 819 A1. Its device parts have an inner and an outer gearing, which are manufactured by forming using cutouts of the metal plate of the device parts. When this is done, the outer gearing has a number of teeth that is at least one less than the inner gearing and one of the device parts is supported on cam means that are rotatable about an pivot axis. By rotating said cam about the pivot axis of the device for adjustment of level of inclination, the inner gearing of the one device part over the outer gearing of the other device part. In this fashion, a pivoting of the device part fixed to the seat back corresponding to the gearing number difference is attained relative to the device part fixed to the seat part. The advantage of this and other, in principal identically constructed adjustment devices resides in the fact that they make possible a continuous adjustment, even under conditions of high loading.

In the event of impact, there can be a slippage of the gearing of the two device parts due to bending away of the parts due to the very high, axially acting forces. In order to prevent this, an axial bracketing of the two device parts is provided. Mounting plates are included, wherein one mounting plate is affixed to one of the device parts and the zonally overlaps the other device part. In the case of the device for adjustment of the level of inclination according to the aforementioned DE 43 03 819 A1 the two device parts are in addition axially secured in the zone of the pivot axis by a metal carrier boss. In addition, the carrier boss has a collar, which abuts on one of the device parts, whilst on the other side of the other device part, a lock washer affixed to the carrier boss provides the axial bracketing.

DE 101 34 355 A1 discloses a device for adjustment of the level of inclination, wherein the carrier, comprised of a carrier plate and a carrier boss is formed in one piece. Here, the carrier plate on the one side of the device for adjustment of the level of inclination provides the axial securing, while on the other side a locking ring is affixed on the carrier boss.

SUMMARY OF THE INVENTION

The object of the present invention is to provide a generic device for adjustment of the level of inclination, wherein a two-part carrier comprised of a carrier boss and a carrier plate for axial bracketing of the two device parts, eliminates the need for an additional locking ring.

This object is achieved according to the invention with a device for adjustment of the level of inclination having the characteristics of described in this disclosure.

In the inventive solution, the carrier disk is used, in addition to its function in introducing an adjustment movement in the cam means, also simultaneously to axially bracket the device for adjustment of the level of inclination, in which it is affixed axially to the carrier boss on side opposite to the collar of the device for adjustment of the level of inclination. Because both parts are made of metal, this bracketing is very stabil. In addition, this "clamping" increases the safety and reliability of the device for adjustment of the level of inclination vis-à-vis the conventional mounting plates clamping the device parts on the periphery of the gearing, against unintended "opening" in the event of impact.

Because of the two-part configuration of the carrier, it is advantageously possible to realize the carrier plate as a die-cut part. This also has a cost-reducing effect. In addition, with relatively minimal plate thickness adequate strength in the carrier is achieved in virtue of the cold forming process used.

In order to obtain a seating of the carrier plate that resists rotation on the carrier boss, the carrier plate is pushed onto a projecting flange of the carrier boss having an non-circular section. The axial fixation of the carrier plate on the carrier box realized in that at least partial zones of the projecting flange end abut force-lockingly on the outer side of the carrier plate. This force-locking connection can, for example, be obtained by cupping or spreading or even by clenching the end of the flange.

Other advantageous configurations of the invention issue from the other subordinate claims.

These and other features of the invention will be more fully understood by reference to the following drawings.

DETAILED DESCRIPTION OF THE INVENTION

Figure 1:
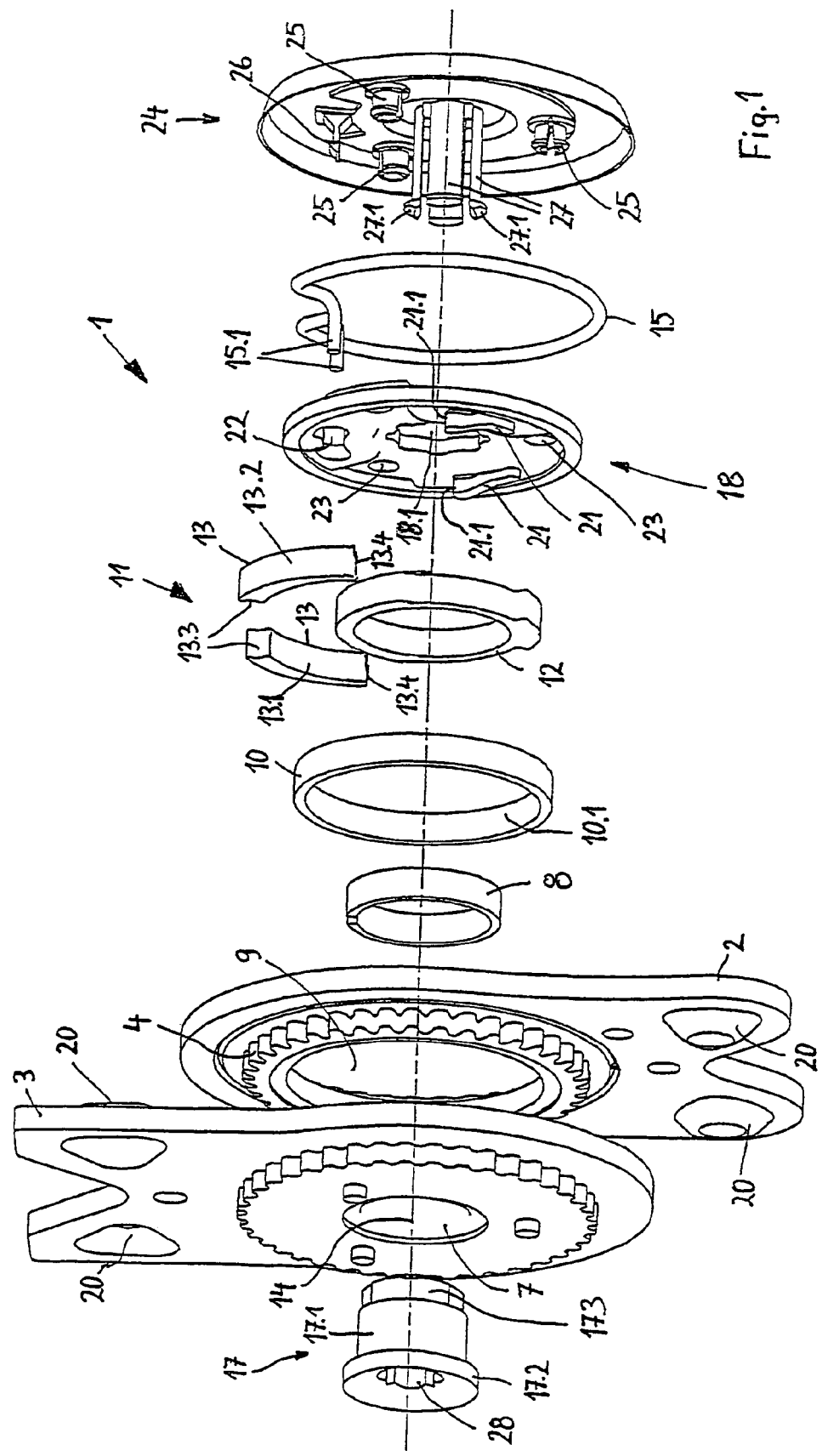
FIG. 1 The structural parts of a device for adjustment of the level of inclination according to the invention in an exploded perspective representation.
Figure 2:
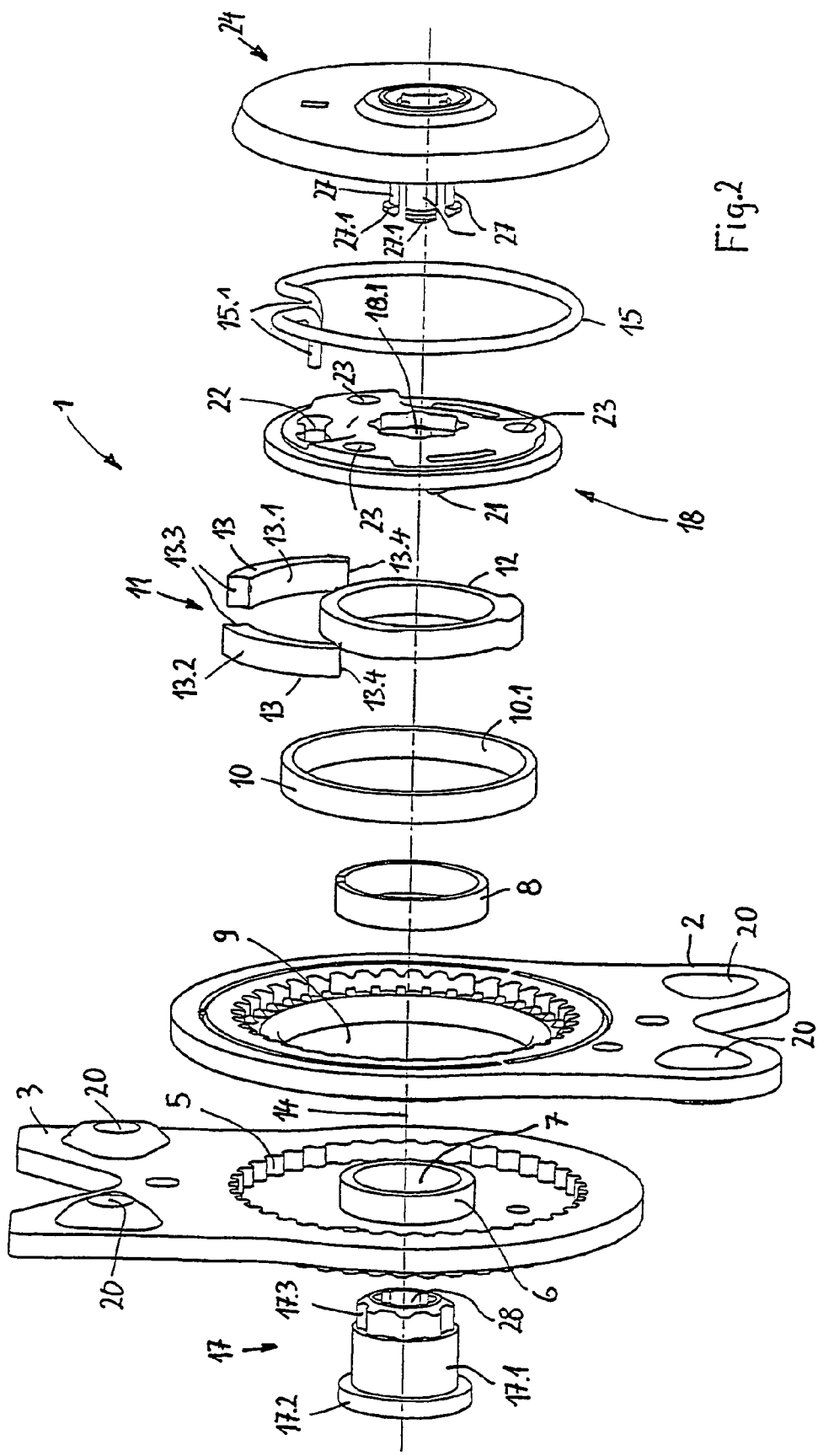
FIG. 2 is a representation according to FIG. 1 from another viewing direction.

During the course of this description, like numbers will be used to identify like elements according to the different views that illustrate the invention.

The device for adjustment of the level of inclination 1 represented in the drawing is part of a motor vehicle (not shown) having a seat part and a backrest, wherein the backrest in its inclination can be adjusted relative to the seat part by means of the device for adjustment of the level of inclination. In addition, the device for adjustment of the level of inclination 1 has a device part 2 affixed to the seat part and a device part 3 affixed to the backrest. Both device parts 2, 3 are sheet steel plates, wherein the device part 2 has an outer gearing 4 stamped out of the plate and the device part 3 has an inner gearing 5 stamped out of the plate. The outer gearing 4 in the same module has a gearing that has one less tooth than the inner gearing 5. In the assembled device for adjustment of the level of inclination 1 the outer gearing 4 and the inner gearing 5 enmesh together. The device part 3 has, in addition, a passage 6 that is stamped concentrically with the inner gearing 5 and which as a circular passage opening 7. An inner bearing ring can be pushed onto the passage 6. The device part 2 also has a circular passage opening 9 arranged concentrically with the outer gearing 4, into which an outer bearing ring 10 can be inserted.

Figure 3:
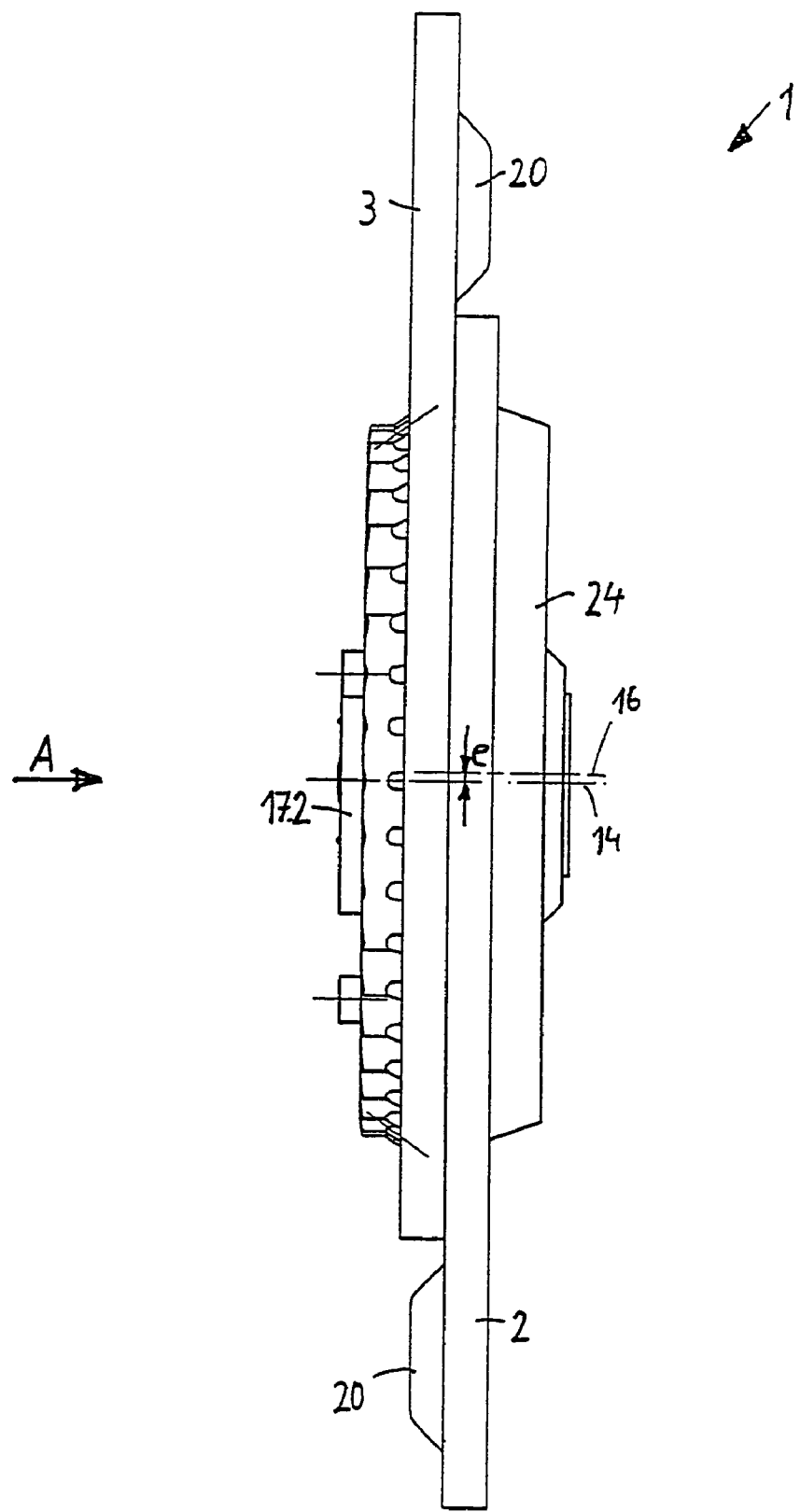
FIG. 3 is a representation of the assembled device for adjustment of the level of inclination.
Figure 4:
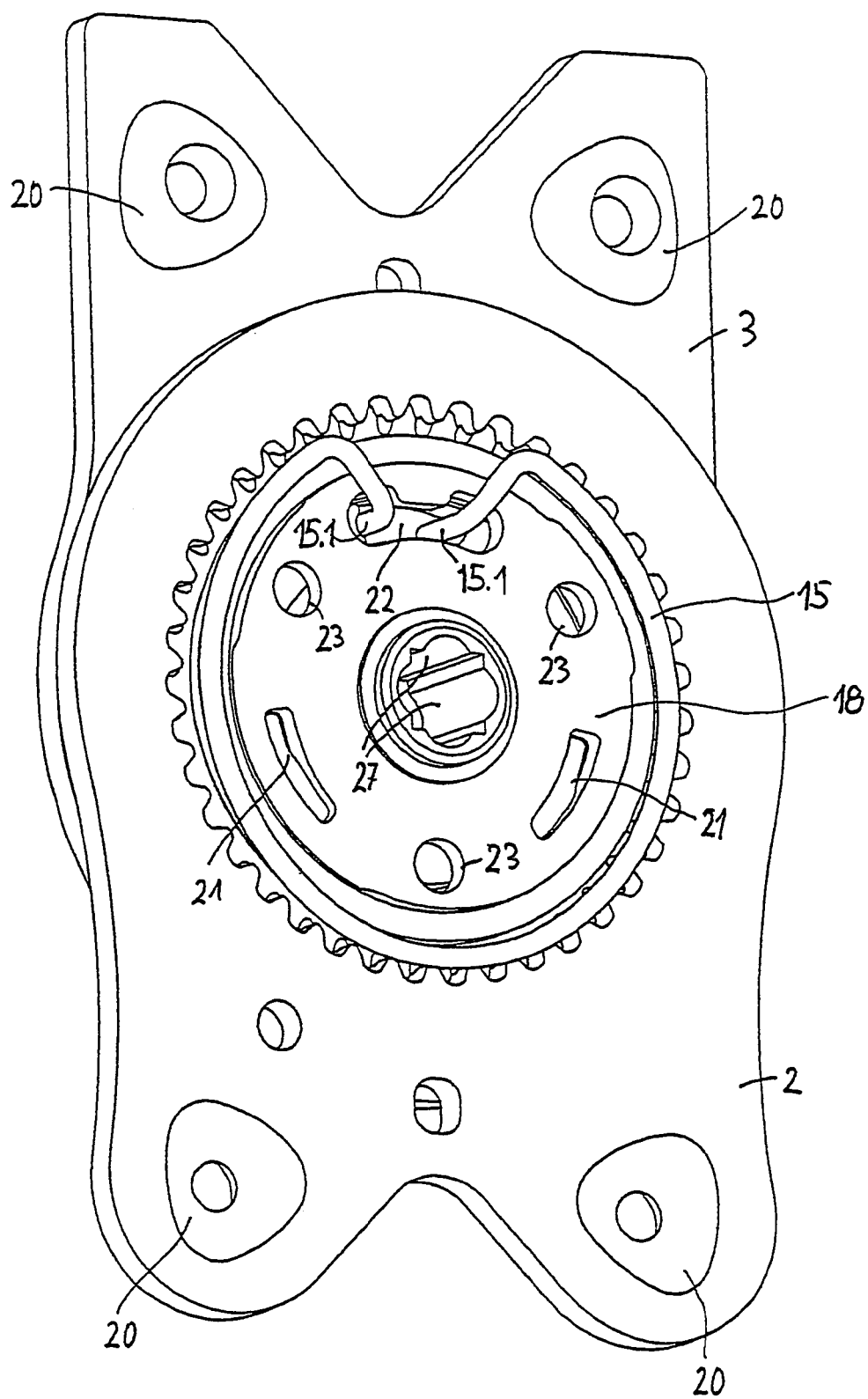
FIG. 4 is a perspective view onto the representation according to FIG. 3 opposite to the direction of the arrow A with the cover cap removed.

The bearing rings 8 and 10 are sued for mounting of cams 11. These are comprised of an eccentric collar 12 and two identical wedge segments 13 arranged in mirror-image. In the assembled state, the eccentric collar 12 is pushed onto the inner mounting ring 8, the wedge segments 13 lie with their inner sides 13.1 on the eccentric collar 12 and the outer sides 13.2 of the wedge segments 13 abut on the inner side 10.1 of the outer bearing ring 10. Because of this intermediation of the cam means 11 between the two device parts 2 and 3, there is an eccentricity e (see FIGS. 3 and 6) between the middle axes of the passage opening 7 of the device part 3 and the middle axis 16 of the passage opening 9 of the device part 2 (see FIGS. 3 and 6) forming the pivot axis 14 of the device for adjustment of the level of inclination 1. This eccentricity e assures that the outer gearing 4 is urged, in extension of the direction of the eccentricity e, into the inner gearing 5 of the device part 3. In order to embody this interlocking of the outer gearing 4 and the inner gearing 5 and the to bearing of the two device parts 2 and 3 free of play, the wedge segments 13 are biased with springs so that they are urged away from each other peripherally on the eccentric collar 12 in the sense of an increase of the eccentricity e. In the present exemplary embodiment an omega spring 15 is provided as the spring means, whose member 15.1 deflected at right angles abut on the facing sides 13.3 of the wedge segments 13 and urge these, as described, apart.

The aforedescribed arrangement assures that the device for adjustment of the level of inclination 1 is arrested without play in any set inclination of the backrest, because the forces acting from the backrest are absorbed radially by the wedge segments 13; thus, no actuating forces are exerted on them. The tension induced by the omega spring 15 on the wedge segments 13 can be relieved only by the tangential forces acting on the wedge segments 13. A two-part carrier, comprised of a carrier boss 17 and a carrier plate 18, is provided for introducing said arresting movement on the cam means 11. The carrier is described in greater detail in the following.

Figure 6:
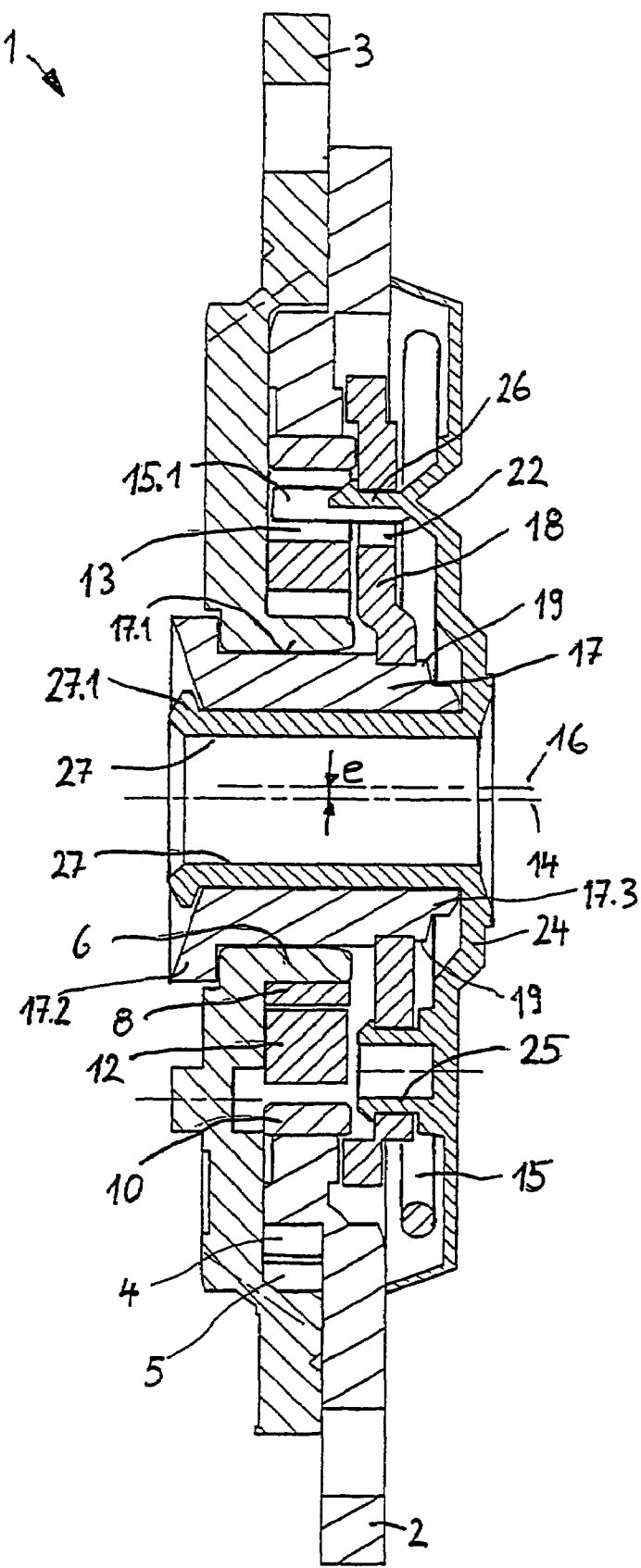
FIG. 6 is a section B-B according to FIG. 5.

Both the carrier boss 17 and the carrier plate 18 are made of metal. Here, the carrier boss 17 is a die cast part or forged part and the carrier plate 18 is executed as a plate metal stamped part. The carrier boss 17 has a cylindrical central section 17.1, a collar 17.2, which diametrically overhangs the cylindrical central section 17.1, and a flange 17.3, diametrically somewhat smaller, having a non-circular cross-section; that is, a cross-section for transferring a torque. In the installed state the central section 17.1 protrudes through the passage opening 7 of the passage 6 with little radial clearance, while its collar 17.2 abuts on the device part 3 from the outside. On the other side of the device for adjustment of the level of inclination 1, the carrier plate 18 is pushed onto the flange 17.3 of the carrier boss 17. For this purpose the carrier plate 18 has a central opening 18.1 with the same non-circular cross-section as the flange 17.3. After pushing on the carrier plate 18 onto the flange 17.3 the carrier plate 18 is accordingly non-rotational on the carrier boss 17. Material of the flange 17.3 is urged onto the carrier disk 18 for axial fixation of the carrier disk 18 on the carrier boss 17, so that projecting barbs 19 are created (as shown in FIG. 6) relative to the cross-section of the central opening 18.1 of the carrier plate 18. The carrier boss 17 and the carrier plate 18 are thus clenched together by the barbs 19.

It is also very clear from the representation according to FIG. 6 that there is an axial bracketing of the two device parts 2 and 3 in addition to the mounting plates (not shown in the representation) by the collar 17.2 of the carrier boss 17 abutting at the device part 3 and the carrier plate 18 on the other side of the adjusting device 1 abutting at device part 2. These mounting plates are welded to the device parts 2 and 3 using a weld bridge 20 and bridge the respective other device part 2 or 3 zonally at the periphery of the inner gearing 5 or the outer gearing 4.

The carrier plate 18 has two expressed carrier fingers 21. In assembled device for adjustment of the level of inclination 1, these carrier fingers 21 each engage into an interspace between the eccentric collar 12 and the outer mounting ring 10. Here, their facial surfaces 21.1 lie peripherally separated from the faces 13.4 of the wedge segments 13 facing away from the omega spring 15. This peripheral spacing between the faces 21.1 and 13.4 is provided, in order that the adjusting force of the omega spring 15 on the wedge segments 13 is not impaired. Along with the carrier fingers 21, the carrier plate 18 has openings 22 and 23. The opening 22 serves as the passage for the member 15.1 of the omega spring 15, while the openings 23 is used for snapping in a plastic cover cap 24 on the carrier plate 18. For this purpose snap nubs 25 are provided on the cover cap 24, which can be pushed into the openings 23 and can be locked behind same. A spring tab 26 is provided on the cover cap 24 as an additional locking means, said tab passing through the opening 22 of the carrier plate and locks behind same.

Figure 5:
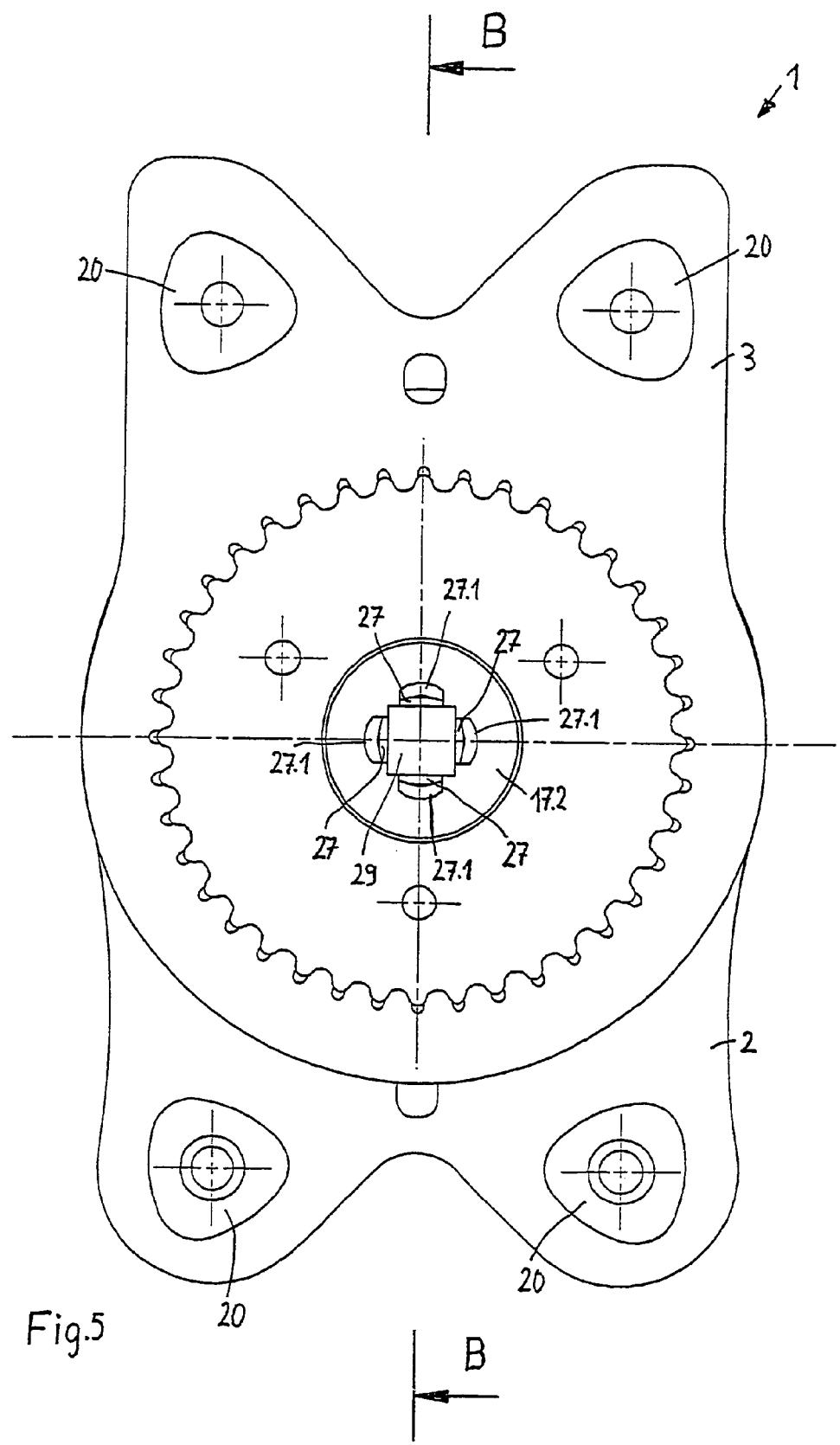
FIG. 5 is a view onto the representation according to FIG. 3 in the direction of the arrow A.

The cover cap 24 is used for coving the omega spring 15 and the carrier plate 18; in particular, however, for covering the open articulation zone of the device for adjustment of the level of inclination 1, in order to protect it from fouling, especially at the time of painting. The cover cap 24 has a fastening means comprised of four tabs 27, which can be inserted form-lockingly into a central recess 28 in the carrier boss 17. When this is done, the inner surfaces of the tabs 27 form a circular cross-section 29; in the case of this exemplary embodiment, a square cross-section, for form-lockingly receiving a driver rod (not shown) (see FIG. 5). This driver rod is used for introducing a torque into the device for adjustment of the level of inclination 1 and can be part of a hand wheel or a motor-driven shaft. Pawls 27.1 are provided at the ends of the tabs 27 of the cover cap 24 and project radially outwards. These interlock after pushing the tabs 27 through the carrier boss 17, behind its collar 17.2, as shown in FIG. 6. With a built-in driver rod, the tabs 17 can no longer yield radially, whereby the locking between the pawls 27.1 and the collar 17.2 is assured.

The embodiment represented of the cover cap 24 assures, together with the carrier boss 17, their secure axial hold on the device for adjustment of the level of inclination 1 and an additional axial bracketing of the two device parts 2 and 3. In addition, the plastic tabs 27 arranged between the driver rod and the carrier boss 17 prevent a metal-metal contact between the driver rod and the carrier boss 17, whereby undesirable rattling noise can be prevented.

For operating the device for adjustment of the level of inclination 1, a torque is transferred to the carrier plate 18 using the driver rod, driven by a hand wheel or a drive motor unit, the tabs 27 of the sleeve of the cover cap 24 and the carrier plate 17. In this way, the face 21.1 of one of its carrier fingers 21, depending in which direction it is rotated, comes to lie on the face 13.4 of the wedge segment 13 associated with this carrier finger 21. With further rotation of the carrier plate 18, effort is applied against the force of the omega spring 15; in other words, the tensioning of the wedge segments 13 between the eccentric collar 12 and the outer bearing ring 10 is relieved, so that a radial play is created for the moving of the device for adjustment of the level of inclination 1. Upon further operation by the driver rod, the wedge segments 13 rotate together with the eccentric collar 12 about the pivot axis 14. Because of this rotary movement of the cam 11, the direction of eccentricity e is extended and thus also the engagement point of the outer gearing 4 in the inner gearing 5. Accordingly a rolling movement of the outer gearing 4 on the inner gearing 5 occurs and the device part 3 pivots on the stationary device part 2. As soon as the torque transfer into the device for adjustment of the level of inclination 1 via the driver rod is ended, the omega spring 15 again urges the wedge segments 13 into their starting position; in other words, the eccentricity e is again increased, whereby the radial clearance required for the adjustment movement is eliminated and the backrest is again arrested.

While the invention has been described with reference to the preferred embodiment thereof, it will be appreciated by those of ordinary skill in the art that modifications can be made to the parts that comprise the invention without departing from the spirit and scope thereof.

The invention claimed is:

1. A device for adjustment of a level of inclination comprising:
    a first device part
    a second device part
    which can be pivoted opposite to each other about a pivot axis,
    whereby the first device part and the second device part have parts of gearings forming a swash mechanism, which roll over each other under the influence of cams that are rotatable about the pivot axis, wherein the cams have a drive which is provided via a two-part carrier comprising:
        a carrier boss and, non-rotatingly connected to it, a carrier plate having at least one carrier finger for rotary carrying of the cams wherein the carrier boss has a central recess receiving a driver rod, and a collar axially bracketing the first device part and the second device part between said collar and said carrier plate on one side of the device for adjustment of the level of inclination, characterized in that the carrier plate is affixed axially on the carrier boss for adjustment of the level of inclination for completing the bracketing of the device parts,
    wherein a plastic cover cap is provided for covering an articulation zone and the central recess of the carrier boss has a larger cross-section than the driver rod, wherein the cover cap has a connector formed from tabs, which can be positively inserted into the central recess of the carrier boss and the tabs have inner surfaces which form a non-circular cross-section for positively receiving the driver rod, wherein the carrier plate has openings and the cover cap has locking nubs, which can be inserted into the openings.

2. The device for adjustment of the level of inclination according to claim 1, wherein the carrier plate is manufactured as a die cut plate part.

3. The device for adjustment of the level of inclination according to claim 2, wherein the carrier boss has a protruding flange with a non-circular profile and the carrier plate locks on to the protruding flange.

4. The device for adjustment of the level of inclination according to claim 1, wherein the carrier boss has a protruding flange with a non-circular profile and the carrier plate locks on to the protruding flange.

5. The device for adjustment of the level of inclination according to claim 1 wherein the tabs have ends which are provided with radially outwardly projecting pawls, which lock on an opposing side of the cover cap behind a component of the device for adjustment of the level of inclination.

* * * * *